(12) United States Patent
Ikizyan et al.

(10) Patent No.: US 11,847,995 B2
(45) Date of Patent: Dec. 19, 2023

(54) VIDEO DATA PROCESSING BASED ON SAMPLING RATE

(71) Applicant: QUALCOMM Incorporated, San Diego, CA (US)

(72) Inventors: Ike Ikizyan, San Diego, CA (US); Nan Zhang, Beijing (CN); Daiou Zeng, Shenzhen (CN); Xinchao Yang, Shanghai (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/919,335

(22) PCT Filed: Jun. 5, 2020

(86) PCT No.: PCT/CN2020/094569
§ 371 (c)(1),
(2) Date: Oct. 17, 2022

(87) PCT Pub. No.: WO2021/243680
PCT Pub. Date: Dec. 9, 2021

(65) Prior Publication Data
US 2023/0169938 A1 Jun. 1, 2023

(51) Int. Cl.
*G09G 5/36* (2006.01)
*G06T 5/40* (2006.01)

(52) U.S. Cl.
CPC ............. *G09G 5/36* (2013.01); *G06T 5/40* (2013.01); *G09G 2320/0626* (2013.01); *G09G 2320/0666* (2013.01); *G09G 2340/0435* (2013.01)

(58) Field of Classification Search
CPC ............. G09G 5/36; G09G 2320/0626; G09G 2320/0666; G09G 2340/0435;
(Continued)

(56) References Cited

U.S. PATENT DOCUMENTS

| | | | | |
|---|---|---|---|---|
| 11,042,754 | B2 * | 6/2021 | Shen | G06F 16/7837 |
| 2015/0310791 | A1 * | 10/2015 | Croxford | G09G 5/10 |
| | | | | 345/589 |
| 2019/0362686 | A1 | 11/2019 | Deepala et al. | |

FOREIGN PATENT DOCUMENTS

| | | |
|---|---|---|
| CN | 104093069 A | 10/2014 |
| CN | 105635715 A | 6/2016 |
| JP | 2010181829 A | 8/2010 |

OTHER PUBLICATIONS

International Search Report and Written Opinion—PCT/CN2020/094569—ISA/EPO—dated Mar. 3, 2021.

* cited by examiner

*Primary Examiner* — Koosha Sharifi-Tafreshi
(74) *Attorney, Agent, or Firm* — Patterson + Sheridan LLP (57) ABSTRACT

In general, aspects disclosed herein provide techniques for processing video data. Certain aspects provide a method for processing video data comprising a plurality of frames for display on a display as discussed herein. The method includes determining a sampling rate (N) based on a frame rate used for displaying the video data on the display. The sampling rate N is greater than 1. The method further includes, for every N frames of the plurality of frames, processing one or more statistics associated with a frame determine one or more display settings. The method further includes outputting to the display the corresponding N frames of the plurality of frames using the one or more display settings.

10 Claims, 4 Drawing Sheets

(58) Field of Classification Search
CPC ............... G09G 5/003; G09G 2320/06; G09G 2320/062; G09G 2320/0673; G09G 2360/08; G09G 2360/16; G06T 5/40; H04N 21/4318; H04N 21/4424; H04N 21/42653

See application file for complete search history.

VIDEO DATA PROCESSING BASED ON SAMPLING RATE

CROSS-REFERENCE TO RELATED APPLICATIONS

This application is a national stage application under 35 U.S.C. 371 of PCT/CN2020/094569 filed Jun. 5, 2020, which is hereby expressly incorporated by reference herein in its entirety as if fully set forth below and for all applicable purposes.

TECHNICAL FIELD

The present disclosure relates generally to display panels and, more particularly, to one or more techniques for display or graphics processing for display panels.

BACKGROUND

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

Computing devices may present graphical content on displays at various frame rates, such as 2.4 Hz, 30 Hz, 60 Hz, 120 Hz, or others. The higher the frame rate, the smoother a user may perceive the graphical content, such as when the graphical content includes fast changing visuals, such as during scrolling, game play, video playback or recording, and other applications demanding a high frame rate. Yet demanding a high frame rate may cause an opposite, interrupted display effect if the CPU or GPU cannot timely handle the processing tasks. For example, when the CPU or GPU is too busy and cannot complete processing in time for a high frame rate, the display may freeze (or slow down) on one frame, resulting in the interrupted display effect such as user interface jank.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

Certain aspects of the present disclosure provide a method for processing video data comprising a plurality of frames for display on a display as discussed herein. The method includes determining a sampling rate (N) based on a frame rate used for displaying the video data on the display. The sampling rate N is greater than 1. The method further includes, for every N frames of the plurality of frames, processing one or more statistics associated with a frame to determine one or more display settings. The method further includes outputting to the display the corresponding N frames of the plurality of frames using the one or more display settings.

Certain aspects of the present disclosure provide a computing device. The computing device further includes a memory and a processor. The memory and the processor are configured to determine a sampling rate N based on a frame rate used for displaying video data comprising a plurality of frames on a display. The sampling rate N is greater than 1. The processor is configured to, for every N frames of the plurality of frames, process one or more statistics associated with a frame to determine one or more display settings. The processor is further configured to output to the display the corresponding N frames of the plurality of frames using the one or more display settings.

Certain aspects of the present disclosure provide a non-transitory computer readable medium storing instructions that when executed by a computing device as discussed herein cause the computing device to operate as discussed herein. For example, the non-transitory computer readable medium stores instructions that, when executed by the computing device, cause the computing device to determine a sampling rate N based on a frame rate used for displaying video data comprising a plurality of frames for display on a display. The sampling rate N is greater than 1. The non-transitory computer readable medium stores instructions that, when executed by the computing device, cause the computing device to, for every N frames of the plurality of frames, process one or more statistics associated with a frame to determine one or more display settings and output to the display the corresponding N frames of the plurality of frames using the one or more display settings.

Certain aspects of the present disclosure provide a computing device comprising means for determining a sampling rate N based on a frame rate used for displaying video data comprising a plurality of frames on a display. The sampling rate N is greater than 1. The computing device also includes means for processing, for every N frames of the plurality of frames, one or more statistics associated with a frame to determine one or more display settings. The computing device further includes means for outputting to the display the corresponding N frames of the plurality of frames using the one or more display settings.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Like numerals indicate like elements.

DETAILED DESCRIPTION

In general, aspects disclosed herein provide techniques for processing video data. The techniques, in certain aspects, may be applicable in scenarios related to processing video data at a high frame rate (as measured in frames per second, or FPS in Hz), or other situations that includes substantial frame-by-frame analyses or computation, such as real time rendering. For example, certain aspects herein provide systems and methods for adapting how often (e.g., by adjusting a sampling rate) statistics are processed for video data and used to determine display settings for displaying frames of video data on a display. For example, one or more statistics may include one or more of a histogram or a noise level of one or more frames that are used to determine (e.g., adjust) display settings for one or more subsequent frames. The one or more display settings may include one or more of a color setting, a tone mapping setting, a display saturation setting, a brightness control setting, or a backlight setting. Such aspects may advantageously reduce or eliminate interrupted display effect, such as user interface jank.

In certain aspects, the video data includes a plurality of frames corresponding to images that may be displayed at a frame rate, such as measured by frames per second (FPS), on a display. The frame rate indicates the number of times per time period (e.g., in one second) that a source feeds an entire frame of new data to a display. Though older devices may have used lower frame rates, such as from 24 Hz or 30 Hz, devices today may operate at higher frame rates, such as at 60 Hz or more, such as 144 Hz, 240 Hz, or higher, as demanded by gaming or other visually intense applications. Furthermore, many high frame rate devices are mobile devices, such as smartphones, tablets, or laptop computers. The mobility of the high frame rate devices places constraints on power consumption, limiting how powerful a CPU and/or GPU may be used or operated therein. For example, a battery-powered smartphone may throttle the CPU/GPU performance when battery life is of concern or when other power draws increase, such as increasing display brightness under the sun. Such power limitation may prevent the CPU or GPU from timely performing desired analyses or changes to the graphic content, causing interruption or delayed response. In certain aspects, to address such problems, the present disclosure provides techniques to process video data corresponding to frames of images by adapting sampling rates based on frame rates, such as those in high frame rate devices.

In some cases, a processor (e.g., a CPU and/or GPU) may analyze content of one or more frames of video data, and use that analysis to adjust one or more display settings used to display one or more subsequent frames of video data. For example, the processor may process one or more statistics based on the content of the one or more frames of video data. The one or more statistics may include, for example, one or more of a noise level associated with the one or more frames of video data or a histogram associated with the one or more frames of video data. In certain aspects, a histogram is an approximate representation of the distribution of numerical or categorical data, such as tonal values of a frame. In certain aspects, the histogram can be global (e.g., across the entire frame) or local (e.g., across a portion of the frame). In certain aspects, the histogram may reflect several aspects of the content of a frame, such as brightness and color. The processor may adjust display settings of the display for displaying one or more subsequent frames of video data based on the one or more statistics, such as to achieve a desired distribution, such as by correcting underexposure or overexposure and removing or adding color shift. For example, the processor may perform one or more processes on the display/one or more subsequent frames based on the one or more statistics, such as changing brightness to save power, performing global or local tone mapping, improving sharpness or softness, increasing color saturation, combining with reference data, smoothing skin-tone area, among other processes. These one or more processes may accordingly include setting or adjusting one or more display settings such as one or more of a color setting, a tone mapping setting, a display saturation setting, a brightness control setting, or a backlight setting.

Unlike the strict per-frame process model, in which the processor collects and calculates statistics and performs adjustments to display settings for each and every frame of video data, the present disclosure reduces overhead by determining a sampling rate based on the frame rate and processing the one or more statistics and adjusting display settings according to the sampling rate. For example, in a high frame rate system having 120 Hz or 240 Hz frame rate, the system may save power consumption and still provide smooth performance by determining the sampling rate N greater than one, such that for every N frames of the total number of frames one set of one or more display settings are used to display each of the N frames. Accordingly, in certain aspects, one or more statistics may be calculated and processed only once for N frames to adjust one or more display settings, instead of a separate one or more statistics being calculated and processed for each and every frame. In certain aspects, N=floor (frame rate in Hz/60 Hz). Accordingly, in some aspects, a subset of the total number of frames is used for collecting and calculating one or more statistics used for adjusting one or more display settings instead of every frame. For example, in certain aspects, when N=2, one or more statistics are processed every other frame, and used to determine one or more display settings to apply to two frames, instead of just one frame, and the overall analyses and processing is reduced by half. As such, the processor has sufficient capacity to handle the statistical analyses and processing without creating an interrupted display effect, such as user interface jank.

In some aspects, determining the sampling rate N is adaptive to the workload and/or processing capacity. Thus the value for N may vary from time to time. For example, the system may start applying N when the system determines that processing every frame is too computationally costly or may not result in a smooth output. In other cases, the system may increase the value of N when the system determines that using the current sampling rate N may not result in a smooth output.

In some aspects, processing one or more statistics may include determining a number of subtasks (also referred to as task dividing) to complete the processing. For each of the subtasks, a corresponding time duration is determined for the completion. For each of the subtasks, a corresponding frame of the N frames is determined for performing the subtask. For example, a subtask may have a time duration similar to a duration of display of a frame based on the frame rate, such as 6.94 ms when the frame rate is 144 Hz. When two subtasks are performed to complete one cycle of statistic processing and display setting adjustment, the sampling rate N=2, and the overall computation is reduced by half. As such, with adaptive sampling rate, and task dividing, the processing load is substantially reduced. Consequently, the user interface (UI) performance may be improved.

Certain aspects herein, including certain devices, and systems therefore enjoy several technical advantages over the conventional methods for processing video data. First, the disclosed techniques in certain aspects avoid overloading the processing unit and ensures a smooth display performance. Second, the disclosed techniques in certain aspects adaptively change sampling rate to properly utilize CPU and/or GPU resources. Third, the disclosed techniques in certain aspects provide reduced computation burden by task dividing. In some aspects, the disclosed techniques apply to histogram, noise level, or other statistic related display features and video features. The disclosed techniques may be used in high frame rate mobile devices that use statistic related display features with good UI performance and power balance. Finally, certain aspects are applicable to any frame content analysis based display and video features. Determining algorithm frame contents subsample rate in run time is one important and useful solution in high frame rate devices.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory.

Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, examples disclosed herein provide techniques for processing video data. For example, the techniques allows for handling high frame rate video content using processors of limited computation and power resources. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit.

In some examples, as used herein, the term "display content" may refer to content generated by a processing unit configured to perform display processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer), A display processing unit may read the graphical content, such as one or more frames from the buffer, and perform one or more display processing techniques thereon to generate display content. For example, a display processing unit may be configured to perform composition on one or more rendered layers to generate a frame.

As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Figure 1:
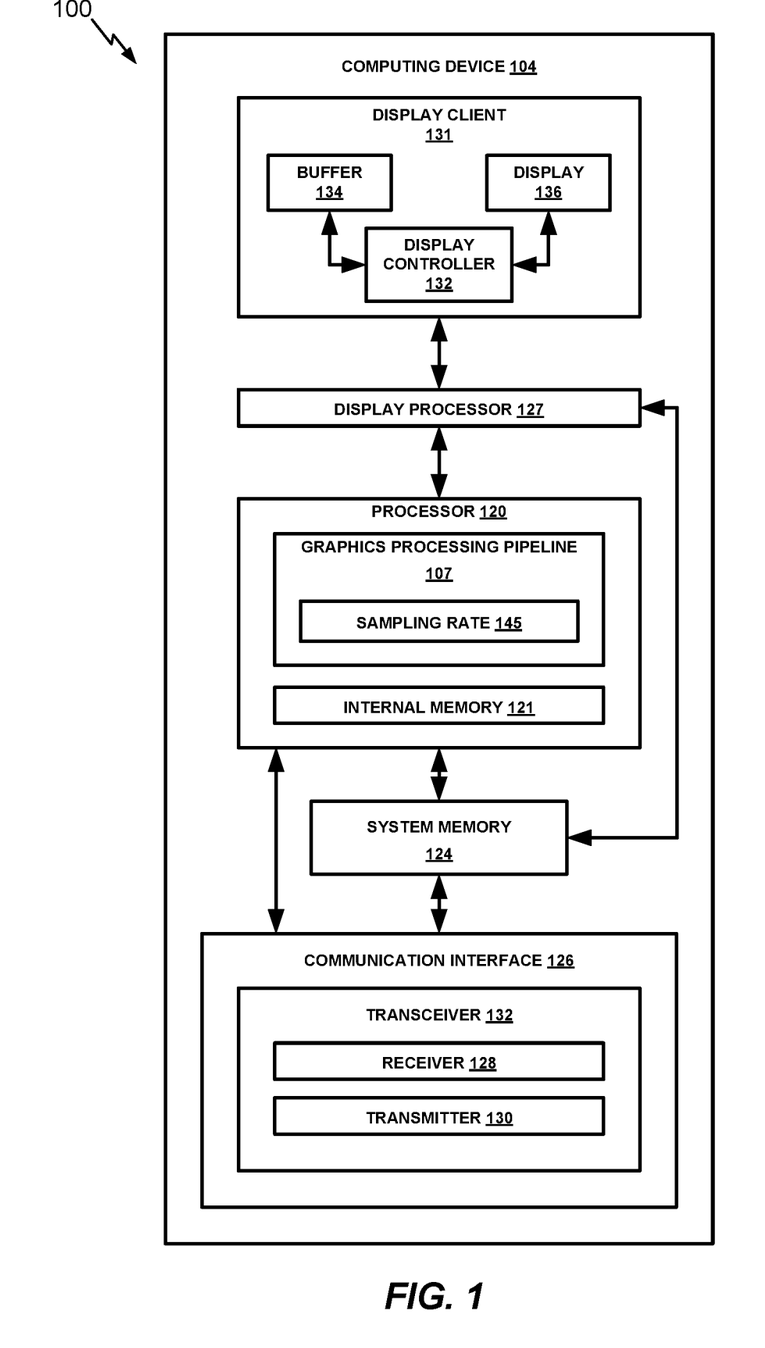
FIG. 1 is a block diagram that illustrates an example computing device configured to process video data, in accordance with one or more aspects of this disclosure.

FIG. 1 is a block diagram that illustrates an example system 100 that includes an example computing device 104 configured to process video data, in accordance with one or more techniques of this disclosure. The computing device 104 may include one or more components or circuits for performing various functions described herein. In some examples, one or more components of the computing device 104 may be components of an SOC. The computing device 104 may include one or more components configured to perform one or more techniques of this disclosure. In the example shown, the computing device 104 may include a processor 120 and a system memory 124.

In some examples, the computing device 104 can include a number of additional or alternative components, e.g., a communication interface 126, a transceiver 132, a receiver 128, a transmitter 130, a display processor 127, and a display client 131. Reference to the display client 131 may refer to one or more displays. For example, the display client 131 may include a single display or multiple displays. The display client 131 may include a first display and a second display, or a foldable or separable display. In other examples, the results of the graphics processing may not be displayed on the device, e.g., the first and second displays may not receive any frames for presentment thereon. Instead, the frames or graphics processing results may be transferred to another device. In some aspects, this can be referred to as split-rendering.

The processor 120 may include an internal memory 121. The processor 120 may be configured to perform graphics processing, such as in a graphics processing pipeline 107. In some examples, the computing device 104 may include a display processor or display processing unit, such as the display processor 127, to perform one or more display processing techniques on one or more frames generated by the processor 120 before presentment by the display client 131. The display processor 127 may be configured to perform display processing. For example, the display processor 127 may be configured to perform one or more display processing techniques on one or more frames generated by the processor 120. The display processor 127 may output image data to the display client 131 according to an interface protocol, such as, for example, the MIPI DSI (Mobile Industry Processor Interface, Display Serial Interface).

The graphics processing pipeline 107 is configured to process input graphics data into signals usable by the display processor 127 or the display client 131. The graphics processing pipeline 107 may depend on software and hardware used and target display characteristics. In some implementations, some graphics application programing interfaces (APIs) such as Direct3D and OpenGL may be used to control the graphics processing pipeline 107. The steps taken by the graphics processing pipeline 107 may be implemented in hardware and optimized therein. In some cases, individual steps of the graphics processing pipeline 107 may run concurrently and placed on hold until a slowest step is completed. In some cases, the graphics processing pipeline 107 may include steps of application, geometry, and rasterization. The application step may involve user input and may be executed by software on the CPU or GPU. The geometry step may include operations carrying out various operations and computations. The rasterization step may output a raster image for each frame. Details of an operation example of the graphics processing pipeline 107 is illustrated in FIG. 2.

Figure 2:
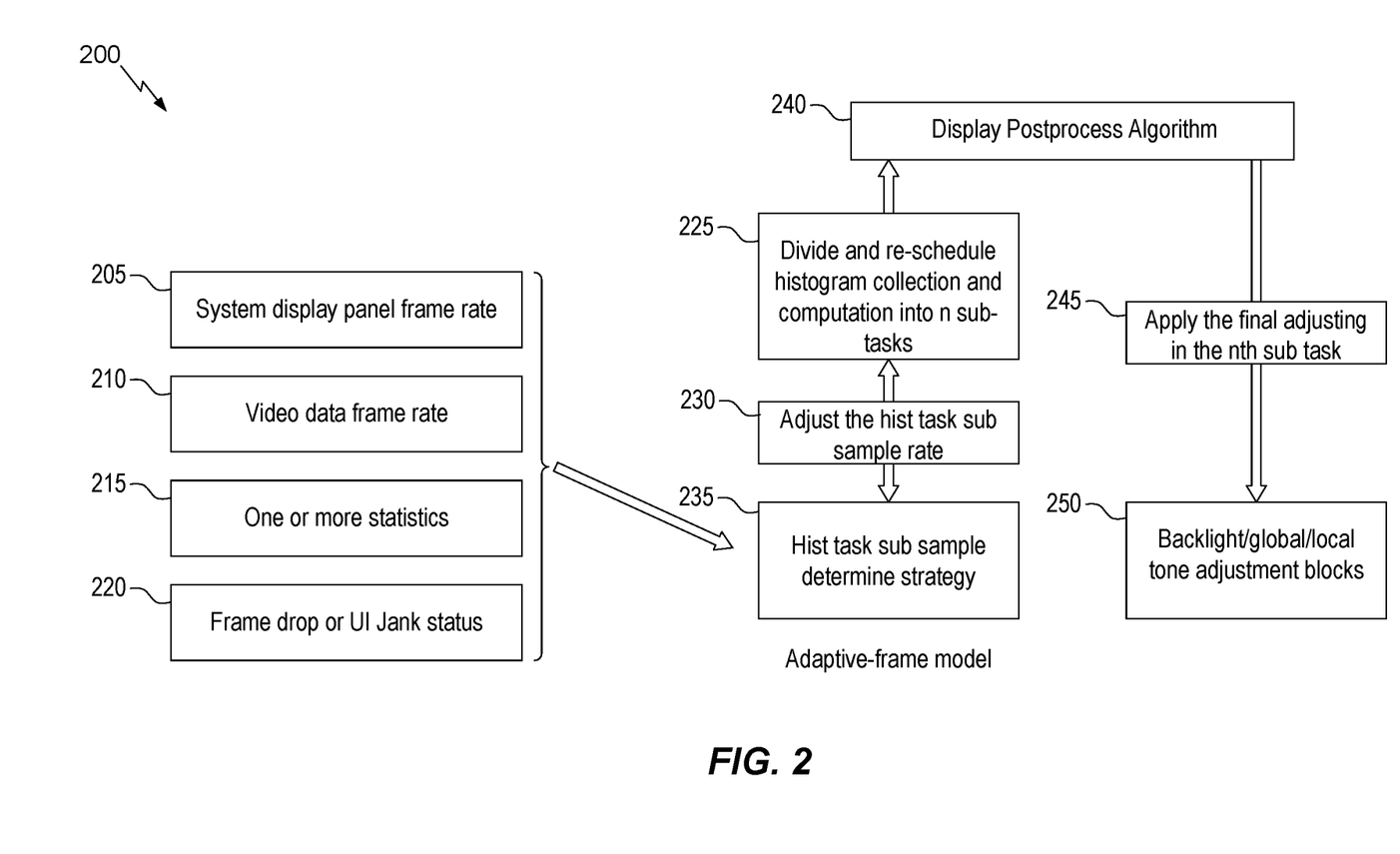
FIG. 2 illustrates an example block diagram of video data processing, in accordance with one or more aspects of this disclosure.

Turning now to FIG. 2, FIG. 2 shows an example block diagram 200 for video data processing, which may be performed in the graphics processing pipeline 107. As shown in FIG. 2, the video data processing takes in various input, including one or more of: system display panel frame rate 205 (e.g., the frame rate the display is capable of running at), video data frame rate 210 (e.g., the frame rate at which the video data itself is generated, which may be the same or different than frame rate 205), one or more statistics 215 of one or more frames such as sequential frame histogram similarity, and frame drop or UI jank status 220. The frame drop or UI jank status 220 refers to a report or a monitoring result indicating the number of frames not processed, either dropped or frozen (or, in jank status). At 235, the processing block of histogram task subsample determination strategy uses information and status related to the system display panel frame rate 205 and the system display primary content frame rate 210 to determine a sampling rate (also called a subsample dividing factor) N. The sampling rate N may vary to reduce the number of frames to be processed in a given time period. For example, for N=2 in an instance of FPS at 120 Hz, statistical analysis or a histogram may be collected and processed every N=2 frames. The effective processing rate is thus lowered to 60 FPS. N may vary from 1 to any greater number. In certain aspects, N is greater than 1, such as for high frame rate. For example, when N=1, the device performs statistical analysis and corresponding adjustments for every frame, thus the effective processing rate for the same example equals the system display primary content FPS 210, at 120 FPS. When N=3, for the example, the device performs statistical analysis and adjustments for every three frames and has an effective processing rate of 40 FPS.

In some aspects, the sampling rate N may be adjusted at 230 according to incoming workload and processing capacity. For example, a greater sampling rate value, such as N=3 or above, may be used when processing capacity is occupied by tasks of higher priorities and the frame drop or UI jank status 220 shows tendency to increase. On the other hand, when the processing capacity is sufficient and the frame drop or UI jank status 220 is maintained such as at zero, then a lower sampling rate value may be used. The adjustment of the sampling rate 230 may depend on specific hardware and software configurations.

At 225, the processor may divide a statistics processing and computation task into N sequential subtasks. The processor divides and/or re-schedules statistics collection and computation for adjustments into multiple subtasks. In certain aspects, each subtask may occupy a same processor execution time, which is 1/N of a whole task processor time, 1/N corresponding to the system display panel frame rate 205 and the system display primary content frame rate 210. For example, assuming the system display primary content frame rate 210 has a frame rate of 120 FPS, each frame has a task processor time of 1 second divided by 120 frames, equal to 8.333 ms. When N=2, each of the two subtasks occupies a same processor execution time of 4.167 ms. In some instances, content for processing/calculating one or more statistics may be from one or more frames prior to the N frames, e.g., referred to singly as frame 0 for ease of illustration. Then, the processing of the one or more statistics occurs between frame 0 and frame N, such that the display settings are adjusted at frame N based on the processing of the one or more statistics. In certain aspects, content from one or more of the N frames may be used as well for processing the one or more statistics. For example, the one or more statistics may be updated for subtasks performed after such one or more N frames based on the content from one or more of the N frames. Updated display settings, in some cases based on look up tables (LUTs) and the processed one or more statistics, may be applied in the $(N)^{th}$ frame. In one illustrative example, when N=2, for every 2 content frames, statistics processing and display setting adjustment is performed once. One example is provided in FIG. 3, where the subtask timeline 300 for N=4, and the subtask timeline 305 for N=1 are shown.

Figure 3:
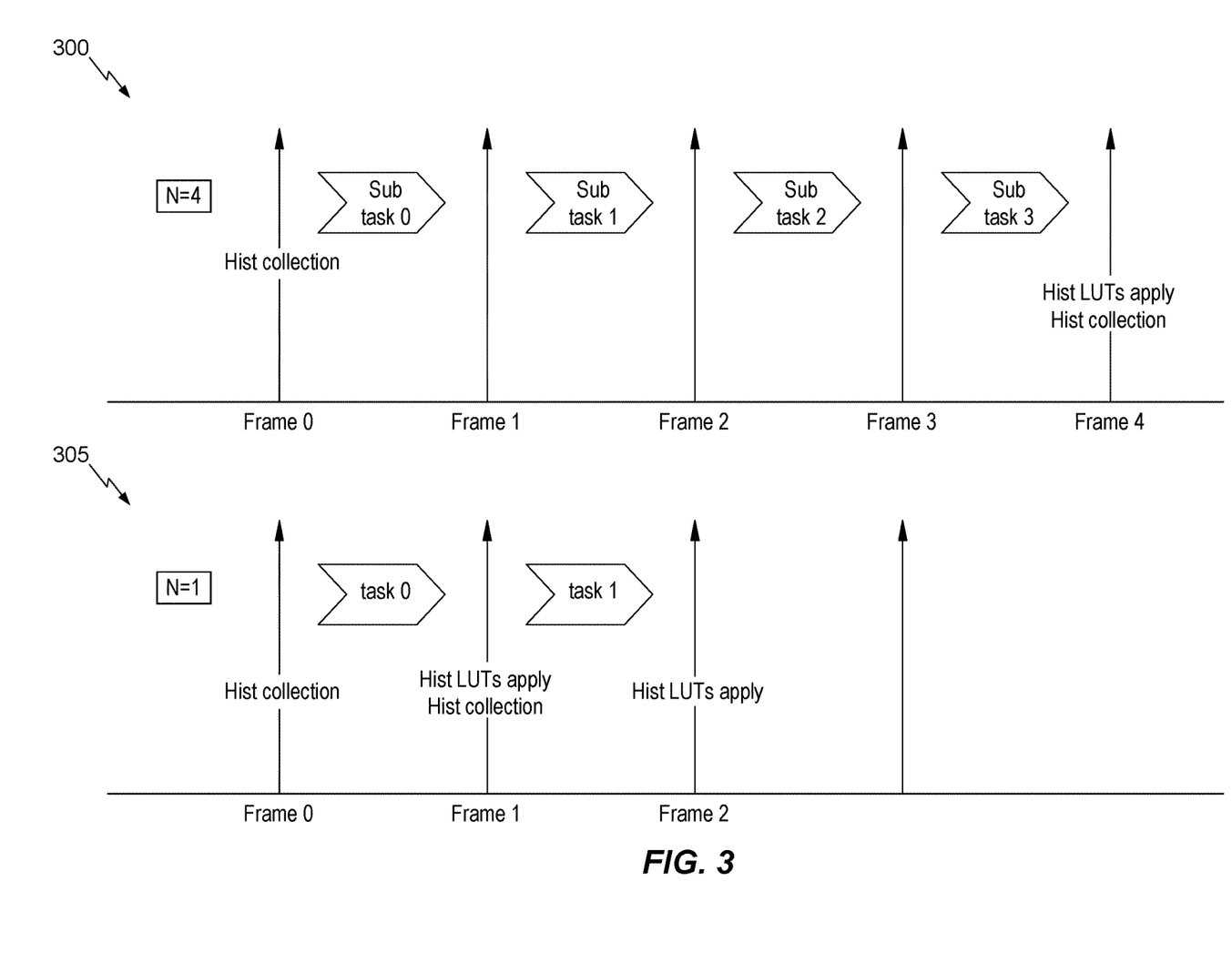
FIG. 3 illustrates an example flow diagram of video data processing, in accordance with one or more aspects of this disclosure.

For example, in subtask timeline 300 where N=4, statistics are collected for frame 0. Further, based on N=4, the processing of the statistics is divided into 4 (N) subtasks 0-3. Subtask 0 is performed between frames 0 and 1, subtask 1 is performed between frames 1 and 2, subtask 2 is performed between frames 2 and 3, and subtask 3 is performed between frames 3 and 4. Accordingly, the display settings based on the processing of statistics between substasks 0-3 are adjusted for the display of frame 4 (N). In certain aspects, additional statistics may be collected and utilized for processing in only certain subtasks. For example, statistics of frame 1 may be collected and also used for performance of one or more of subtasks 1-3 as they occur after frame 1. Further, in certain aspects, some display settings may be adjusted for one or more frames prior to frame N. For example, if subtask 0 indicates update of a subset of display settings, those may be adjusted for display of frame 1 and possibly the remaining frames of the N frames.

As shown in timeline 305 for N=1, statistics are collected for frame 0. Further, only one task, task 0, is performed between frame 0 and frame 1, and the display settings for frame 1 are adjusted based on task 0 using statistics from frame 0. Further, statistics are again collected for frame 1, and one task, task 1, is performed between frame 1 and frame 2, and the display settings for frame 2 are adjusted based on task 1 using statistics from frame 1.

At 240, a post processing algorithm for the display is executed based on the divided subtasks scheduled at 225. The post processing algorithm process one or more statistics associated with a frame and determine one or more display settings, such as a color setting, a tone mapping setting, a display saturation setting, a brightness control setting, or a backlight setting. For example, the color setting may include white balance adjustment, color filtering, or other settings. Tone mapping setting may map one set of colors to another. Display saturation setting may change image color saturation to enhance or suppress color vibrancy. The brightness control setting may adjust image brightness, such as how bright the highlight areas should be. The backlight setting may adjust the backlight brightness based on ambient lighting conditions.

At 245, the processor applies the adjustment in the $N^{th}$ frame, completing one task cycle. At 250, the processed frame is output to the adjustment block, such as having the adjustment for the backlight, global tone adjustment, and local tone adjustment. The adjustment block may forward the processed results to the display processor 127 and the display client 131.

The display client 131 may be configured to display or otherwise present frames processed by the display processor 127. In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

In the illustrated example of FIG. 1, the display client 131 includes a display controller 132, a buffer 134, and a display 136. The example display 136 includes a plurality of pixel elements for displaying image data. The display controller 132 may receive image data from the display processor 127 and store the received image data in the buffer 134. In some examples, the display controller 132 may output the image data stored in the buffer 134 to the display 136. Thus, the buffer 134 may represent a local memory to the display client 131. In some examples, the display controller 132 may output the image data received from the display processor 127 to the display 136.

Furthermore, as disclosed above, the display client 131 may be configured in accordance with MIPI DSI standards. The MIPI DSI standard supports a video mode and a command mode. In examples where the display client 131 is operating in video mode, the display processor 127 may continuously refresh the graphical content of the display client 131. For example, the entire graphical content may be refreshed per refresh cycle (e.g., line-by-line).

In examples where the display client 131 is operating in command mode, the display processor 127 may write the graphical content of a frame to the buffer 134. In some such examples, the display processor 127 may not continuously refresh the graphical content of the display client 131. Instead, the display processor 127 may use a vertical synchronization (Vsync) pulse to coordinate rendering and consuming of graphical content at the buffer 134. For example, when a Vsync pulse is generated, the display processor 127 may output new graphical content to the buffer 134. Thus, the generating of the Vsync pulse may indicate when current graphical content at the buffer 134 has been rendered.

Memory external to the processor 120, such as system memory 124, may be accessible to the processor 120. For example, the processor 120 may be configured to read from and/or write to external memory, such as the system memory 124. The processor 120 may be communicatively coupled to the system memory 124 over a bus. In some examples, the processor 120 and the system memory 124 may be communicatively coupled to each other over the bus or a different connection.

It should be appreciated that in some examples, the computing device 104 may include a content encoder/decoder configured to receive graphical and/or display content from any source, such as the system memory 124 and/or the communication interface 126. The system memory 124 may be configured to store received encoded or decoded content. In some examples, the content encoder/decoder may be configured to receive encoded or decoded content, e.g., from the system memory 124 and/or the communication interface 126, in the form of encoded pixel data. In some examples, the content encoder/decoder may be configured to encode or decode any content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the computing device 104 and moved to another device.

As another example, the system memory 124 may not be removable from the computing device 104.

The processor 120 may be a central processing unit (CPU), a graphics processing unit (GPU), a general purpose GPU (GPGPU), or any other processing unit that may be configured to perform graphics processing. In some examples, the processor 120 may be integrated into a motherboard of the computing device 104. In some examples, the processor 120 may be present on a graphics card that is installed in a port in a motherboard of the computing device 104, or may be otherwise incorporated within a peripheral device configured to interoperate with the computing device 104. The processor 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processor 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors. In some aspects, the processor 120 may include or may integrate with the display processor 127.

In some aspects, the content generation system 100 can include a communication interface 126. The communication interface 126 may include a receiver 128 and a transmitter 130. The receiver 128 may be configured to perform any receiving function described herein with respect to the computing device 104. Additionally, the receiver 128 may be configured to receive information, e.g., eye or head position information, rendering commands, or location information, from another device. The transmitter 130 may be configured to perform any transmitting function described herein with respect to the computing device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the computing device 104.

In some examples, the graphical content from the processor 120 for display via the display client 131 is not static and may be changing. Accordingly, the display processor 127 may periodically refresh the graphical content displayed via the display client 131. For example, the display processor 127 may periodically retrieve graphical content from the system memory 124, where the graphical content may have been updated by the execution of an application (and/or the processor 120) that outputs the graphical content to the system memory 124.

It should be appreciated that while shown as separate components in FIG. 1, in some examples, the display client 131 (sometimes referred to as a "display panel") may include the display processor 127.

As shown in FIG. 1, in certain aspects, the display processor 127 (also referred to as a display processing unit (DPU)) may be configured to operate functions of the display client 131. For example, in certain aspects, the display processor 127 is configured to output a plurality of code words, such as corresponding to a frame, to the display controller 132. Each code word may be represented by a binary number in the digital domain. Each code word may correspond to a pixel (e.g., red, green, blue, white, etc.) of the display 136.

The display controller 132 may be configured to convert the code words received from the display processor 127 to analog signals used to drive the pixels of the display 136. In certain aspects, for each code word corresponding to a pixel, the display controller 132 is configured to convert the code word to an analog signal(s) that drives the pixel to a particular brightness level. Accordingly, in certain aspects, the code word and/or analog signal(s) correspond to a brightness level for the pixel.

The following description uses the processor 120 as an example, and similar techniques, methods, or processes performed by the processor 120 may also be performed in the display processor 127 or in combination therewith.

As described herein, a device, such as the computing device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

Figure 4:
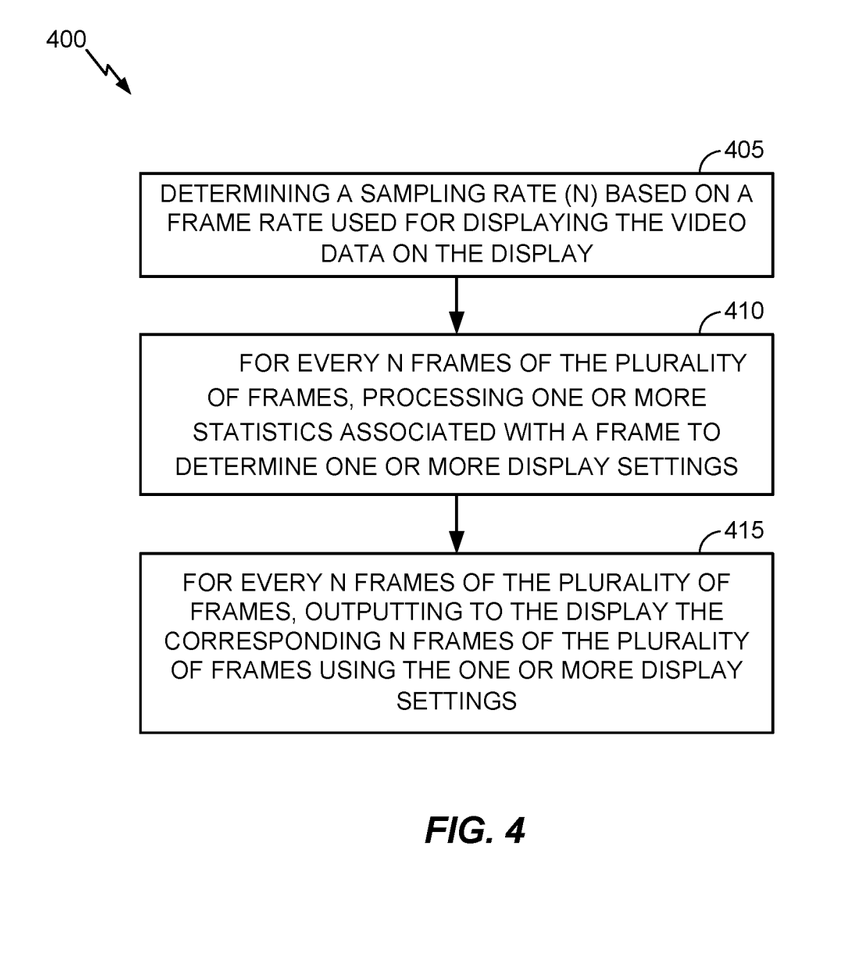
FIG. 4 illustrates example operations for a computing device operable to process video data, according to certain aspects of the present disclosure.

FIG. 4 illustrates example operations 400 for a computing device operable to process video data. In some examples, the operations 400 may be performed by the processor 120 or the display processor 127 of FIG. 1. For example, the processor 120 or the display processor 127 may process video data including a number of frames for display on the display 136.

The operations 400 begins, at 405, by determining a sampling rate (N) based on a frame rate used for displaying video data comprising a plurality of frames for display on a display. In some aspects, the sampling rate is greater than 1 (e.g., at least two). In some aspects, the sampling rate may vary depending on the complexity of the video data and capacity of the processor. For example, the operations 400 may be triggered when the processor does not have sufficient resources to process each frame of the video data (e.g., when N=1) and has suffered frame drop. In other cases, a higher value of the sampling rate may be determined if the processor does not have sufficient resources to process the video data at the present sampling rate (for example, N increases from 2 to 3 when needed). On the other hand, the value for the sampling rate may decrease if too much processing resource idles. Specific hardware and software configuration may be used to determine and dynamically update the sampling rate N.

At 410, for every N frames of the plurality of frames, one or more statistics associated with a frame are processed to determine one or more display settings. In some aspects, the one or more statistics may include one or more of a histogram or a noise level. The one or more display settings may include one or more of a color setting, a tone mapping setting, a display saturation setting, a brightness control setting, or a backlight setting. The one or more statistics may further be associated with at least one additional frame. The frame may be a frame that occurs prior to the N frames. The at least one additional frame may include one or more frames that occur prior to the N frames. The at least one additional frame may include one or more frames of the N frames. For example, the one or more statistics may correspond to the statistics of the frame (e.g., directly) prior to the N frames, to a combination of statistics of a plurality of frames that occur prior to the N frames, or to statistics of one or more frames prior to the N frames and statistics for one or more of the N frames. For example, statistics of one of the N frames may be used to update the statistics used for one or more subtasks that occur after the one of the N frames.

In some examples, processing the one or more statistics may include determining a plurality of subtasks for performing the processing. For example, in certain aspects, for a sampling rate N, each time period of the content frame includes N subtasks. For each of the plurality of subtasks, a corresponding time duration is determined for completing the corresponding subtask. For example, in certain aspects, each subtask may occupy 1/(N*FPS) a second. For each of the number of subtasks, a corresponding frame of the N frames is determined during which the corresponding subtask is performed based on the corresponding time duration.

At 415, the corresponding N frames of the plurality of frames are output to the display using the one or more display settings. In some cases, one or more transformations are applied to the corresponding N frames using the one or more display settings.

In some aspects, the operations 400 further includes determining the one or more statistics based on image data of the frame. For example, the image data may correspond to one or more of unrendered layer data of the frame, uncomposed rendered layer data of the frame, or composed rendered layer data of the frame.

In one configuration, a method or apparatus for display processing is provided. The apparatus may be a processing unit, a display processor, a display processing unit (DPU), a graphics processing unit (GPU), a video processor, or some other processor that can perform display processing. In some examples, the apparatus may be the processor 120 within the computing device 104, or may be some other hardware within the computing device 104, or another device.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave.

Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data comprising a plurality of frames for display on a display, the method comprising:
    determining a sampling rate (N) based on a frame rate used for displaying the video data on the display, wherein N is greater than 1; and
    for every N frames of the plurality of frames:
    processing one or more statistics associated with a frame to determine one or more display settings; and
    outputting to the display the corresponding N frames of the plurality of frames using the one or more display settings.

2. The method of claim 1, wherein the one or more statistics comprise one or more of a histogram or a noise level.

3. The method of claim 1, wherein the one or more display settings comprise one or more of a color setting, a tone mapping setting, a display saturation setting, a brightness control setting, or a backlight setting.

4. The method of claim 1, wherein the one or more statistics are further associated with at least one additional frame.

5. The method of claim 1, wherein the processing the one or more statistics comprises:
    determining a plurality of subtasks for performing the processing;
        for each of the plurality of subtasks, determining a corresponding time duration for completing the corresponding subtask; and
        for each of the plurality of subtasks, determining a corresponding frame of the N frames during which to perform the corresponding subtask based on the corresponding time duration.

6. The method of claim 1, wherein outputting to the display the corresponding N frames of the plurality of frames using the one or more display settings comprises applying one or more transformations to the corresponding N frames using the one or more display settings.

7. The method of claim 1, further comprising determining the one or more statistics based on image data of the frame, the image data corresponding to one or more of unrendered layer data of the frame, uncomposed rendered layer data of the frame, or composed rendered layer data of the frame.

8. A computing device comprising:
    a memory; and
    a processor coupled to the memory wherein the memory and the processor are configured to perform the method of:
    determining a sampling rate (N) based on a frame rate used for displaying the video data on the display, wherein N is greater than 1; and
    for every N frames of the plurality of frames:
    processing one or more statistics associated with a frame to determine one or more display settings; and
    outputting to the display the corresponding N frames of the plurality of frames using the one or more display settings.

9. A computing device comprising:
    means for performing the method of:
    determining a sampling rate (N) based on a frame rate used for displaying the video data on the display, wherein N is greater than 1; and
    for every N frames of the plurality of frames:
        processing one or more statistics associated with a frame to determine one or more display settings; and
        outputting to the display the corresponding N frames of the plurality of frames using the one or more display settings.

10. A non-transitory computer-readable medium including instructions that when executed by a computing device, cause the computing device to perform the method of:
    determining a sampling rate (N) based on a frame rate used for displaying the video data on the display, wherein N is greater than 1; and
    for every N frames of the plurality of frames:
    processing one or more statistics associated with a frame to determine one or more display settings; and
    outputting to the display the corresponding N frames of the plurality of frames using the one or more display settings.

* * * * *